Patented Sept. 25, 1945

2,385,551

UNITED STATES PATENT OFFICE 2,385,551

PROCESS FOR THE PREPARATION OF ACRYLONITRILE

Le Roy U. Spence, Elkins Park, Darrel J. Butterbaugh, Philadelphia, and Edwin H. Kroeker, Cheltenham, Pa., assignors to Röhm & Haas Company, Philadelphia, Pa.

No Drawing. Application August 16, 1940, Serial No. 352,930

11 Claims. (Cl. 260—464)

This invention relates to a process of making acrylonitrile by the vapor phase reaction of acetylene and hydrogen cyanide in the presence of certain catalysts.

It has heretofore been proposed to react acetylene and hydrogen cyanide in vapor phase in the presence of such catalysts as silica gel, activated carbon, silica gel impregnated with boric acid, and barium cyanide or sodium cyanide supported on activated carbon. While such catalysts promote a reaction between the acetylene and hydrogen cyanide, the reaction product is in most instances a water soluble material that does not polymerize and only in the case of the boric acid catalyst is any acrylonitrile obtained. Even with the boric acid catalyst the yield is so low that the method is not suitable for the production of acrylonitrile.

The object of this invention is to provide a commercially feasible method of making acrylonitrile from acetylene and hydrogen cyanide. A further object is to provide catalysts that promote the addition of one molecule of hydrogen cyanide to one molecule of acetylene to form acrylonitrile under conditions which do not substantially decompose either the acetylene or the hydrogen cyanide and which are unfavorable to side reactions.

We have found that acrylonitrile in yields as high as 70% of the hydrogen cyanide used may be readily obtained by passing acetylene and hydrogen cyanide in the vapor phase over catalysts containing certain metals of group IIB of the periodic table. These catalysts are primarily compounds of cadmium, magnesium, and zinc, with particularly good results being obtained with compounds of zinc. The free metals may also be used. The various compounds of the metals capable of withstanding the temperatures employed may be used, including the oxides, hydroxides, and various salts, such as the ferrocyanides, phosphates, carbonates, cyanides, salts of organic acids such as the acetates, formates, butyrates, etc., various basic salts and zinc zeolite. Compounds which are somewhat basic in nature or which at least in part react with hydrogen cyanide to form metal cyanides have been found to be particularly good. The preferred temperatures for the reaction are higher than the melting points of zinc and cadmium, and hence, when these metals are used it is necessary to support them on a carrier to prevent their flowing out of the catalyst tube. Alloys of any two or more of the metals, zinc, magnesium and cadmium, may also be employed.

The catalysts may be prepared by methods well known in the art, as for instance, evaporating a solution of a soluble compound on an inert carrier, precipitating an insoluble compound on an inert carrier, or mixing an aqueous slurry of an insoluble compound or of the free metal with an inert carrier, filtering, pressing, and drying the filter cake, and finally grinding to the desired particle size. The inert carriers may be such materials as quartz, Filtros, diatomaceous earth, various clays, pumice, alumina, carborundum, etc. In some instances, particularly in the case of metallic, oxide, hydroxide, carbonate, and acetate catalysts, the activity is improved by passing hydrogen cyanide over them at temperatures above 150° C. This treatment to some extent forms the cyanide of the metal and may be used to produce a metal cyanide catalyst or a mixed catalyst of metal cyanide and metal oxide, hydroxide, carbonate, acetate, etc. While the best particle size of the catalyst will depend to some extent upon the construction of the catalyst tube, we have found most practical, granules that will pass a four mesh screen but not a ten mesh one.

During the course of the reaction some carbonaceous material is gradually deposited on the catalyst and reduces its activity. This deposit may, however, be removed and the activity restored by passing air, alone or diluted with nitrogen, carbon dioxide, or steam over the catalyst at 400° to 600° C. To allow for this reactivation, it is desirable to provide the plant for carrying out the reaction with two converters connected in parallel so that the catalyst in one converter may be reactivated while the other converter is being used. To restore full activity to the reactivated catalyst it is sometimes necessary to pass hydrogen cyanide over the catalyst at temperatures above 150° C., the same as in the case of the freshly prepared catalyst.

The reaction is carried out by passing a mixture of acetylene and hydrogen cyanide in vapor phase over the catalyst in a tube provided with a surrounding heat exchange medium. The reaction mixture may contain an equimolar ratio of acetylene and hydrogen cyanide, or either reactant may be present in excess. For economical reasons we prefer to use an excess of acetylene, as the percentage yield of acrylonitrile based on the hydrogen cyanide is thereby increased. Any unreacted acetylene and hydrogen cyanide may be recirculated over the catalyst. The presence in the reaction mixture of small amounts of water vapor is beneficial in that it improves the percent yield somewhat and reduces the amount of deposit formed on the catalyst. Dilution of the reacting gases with nitrogen or other inert gases also has a beneficial effect.

At atmospheric pressures the reaction starts at a temperature of about 350° C. and may be carried out at temperatures up to 600° C. Preferably the temperature is kept within the range of from 400° to 500° C. The reaction is exothermic and hence means must be provided for dissipating the heat of reaction as for example a molten salt bath, mercury bath, and similar devices known to the art. While we prefer to operate at atmospheric pressure elevated pressures may be used if desired.

The rate of flow of reactants over the catalyst may be varied within wide limits. A space velocity (volumes of gas per volume of catalyst per hour) of 75 gives high yields of acrylonitrile and much lower velocities may be used. Higher velocities are preferred, however, as the deposit on the catalyst is thereby decreased.

In the following examples, which are given both to illustrate the practice of the invention and the results obtainable thereby, the hydrogen cyanide and acetylene were mixed, passed through a steam jacketed preheater tube and then through a catalyst tube ½ to ¾ inch in diameter and twenty-five inches long. The gases were passed through the reaction tube at a rate of two gram mols/hour. The exit gases were first passed through a condenser in which they were cooled to from 0° to −10° C. to condense the liquid products and then through a hydrogen cyanide absorber in which any uncondensed hydrogen cyanide was recovered. The liquid products of the reaction were distilled through a fractionating column, first separating unchanged hydrogen cyanide which was absorbed, and then separating the acrylonitrile fraction.

*Example 1.*—The catalyst was prepared by adding to a 15% aqueous solution of zinc acetate twice its weight of 4 to 8 mesh quartz particles, evaporating the mixture to dryness, placing it in the reaction tube and passing a mixture of equal parts of hydrogen cyanide and nitrogen over it at a temperature of 165° C. for 1 hour. The zinc acetate coated particles contained 6.2% by weight of zinc acetate and part of this was converted to zinc cyanide by the hydrogen cyanide treatment.

A mixture of equimolecular quantities of acetylene and hydrogen cyanide were passed over this catalyst at a temperature of from 480° to 500° C. Of the hydrogen cyanide passed through the converter 62% was consumed and of this 56% was converted to acrylonitrile.

*Example 2.*—Equal parts of zinc acetate and Superfloss (a commercial powdered diatomaceous earth) were added to water and stirred to a slurry which was first evaporated to a thick, pasty mass and then dried in an oven at 110° C. The dried cake was broken up and the 4 to 14 mesh particles placed in the reaction tubes. A mixture of hydrogen cyanide and nitrogen was then passed over the catalyst at 165° C. for 2 hours.

A mixture of equimolecular quantities of hydrogen cyanide and acetylene was passed over the catalyst, the temperature of which was gradually increased from 350° to 400° C. by means of an electric coil surrounding the catalyst tube. Substantial reaction began when the temperature reached 400° C. and it rapidly rose to approximately 480° C. The yield of acrylonitrile based on the hydrogen cyanide consumed was 52.7% and the consumption of hydrogen cyanide was 60% of the input.

*Example 3.*—180 parts of $Zn(NO_3)_2 6H_2O$ was dissolved in 500 parts of water, and 120 parts Superfloss was added. Sufficient ammonium hydroxide was added while the mixture was being stirred until it was slightly alkaline. It was then filtered, washed, dried over night at 65° C., broken up, and screened. The 4 to 10 mesh particles were placed in the reaction tubes.

A mixture of equimolecular quantities of hydrogen cyanide and acetylene was passed over the catalyst which had been heated to 400° C. The heat of reaction again caused the temperature to rise to 480° C. 66% of the hydrogen cyanide passed over the catalyst was consumed. The yield of acrylonitrile based on hydrogen cyanide consumed was 49%.

When a mixture containing 2.3 mols of acetylene per mol of hydrogen cyanide was passed over the catalyst and the temperature held at 430–440° C. by means of a salt bath surrounding the catalyst tube, 97% of the hydrogen cyanide was consumed, and the yield of acrylonitrile based on the hydrogen cyanide input was 70%.

*Example 4.*—A zinc oxide catalyst was prepared by mixing two parts Superfloss and one part zinc oxide (commercial grade, through 28 mesh), adding water to form a slurry, filtering, packing the filter cake hard, drying overnight at 65° C., and then breaking the dried cake and screening. The 4 to 10 mesh particles were used.

An equimolecular mixture of acetylene and hydrogen cyanide was passed over this catalyst at a temperature held at 440° to 475° C. by means of a salt bath. 70% of the hydrogen cyanide was consumed and a yield of 53.7% of acrylonitrile based on the hydrogen cyanide consumed was obtained.

When the activity of the catalyst decreased to a point at which it would be impractical to use it further, air was passed through the reaction tube for eight hours while the salt bath was held at a temperature of 450° C. A mixture of equal amounts of nitrogen and hydrogen cyanide was then passed through the tube.

When a mixture of equimolecular quantities of acetylene and hydrogen cyanide was passed over the reactivated catalyst at 440°–460° C., 83% of the hydrogen cyanide was converted and a 65.5% yield of acrylonitrile obtained.

When equimolar quantities of acetylene and hydrogen cyanide with 2½% water vapor added were passed over the zinc oxide catalyst, freshly prepared as above described, 60.4% of the hydrogen cyanide was converted and a 67% yield of acrylonitrile obtained. The amount of carbonaceous deposit on the catalyst was also reduced.

*Example 5.*—With two parts Superfloss and one part zinc cyanide, a zinc cyanide catalyst was made by the same method used in Example 4 for the zinc oxide catalyst. It was placed in the converter and its temperature gradually increased from 300° C. to 600° C. while a mixture of equimolecular amounts of acetylene and hydrogen cyanide was passed over it. A reaction became noticeable when the temperature reached about 312° C. and the catalyst was effective throughout the rest of the range, giving an overall yield of 42% acrylonitrile based on the hydrogen cyanide consumed. 44% of the hydrogen cyanide passed through the converter unaffected and could have been recirculated with the unchanged acetylene.

*Examle 6.*—Four parts Zn(NO₃)₂6H₂O, four parts Superfloss and 1 part phosphoric acid (85%) were added to water and stirred to a slurry. While still stirring, enough ammonium hydroxide was added to make the mixture just alkaline. It was then filtered, dried, broken up, and screened as in Example 3. Over a temperature range of from 312° to 508° C. it produced a 59% conversion of hydrogen cyanide and a 51% yield of acrylonitrile from an equimolar mixture of acetylene and hydrogen cyanide.

*Example 7.*—A magnesium hydroxide catalyst was prepared by mixing two parts

Mg(NO₃)₂6H₂O and 1 part Superfloss with water, adding sufficient ammonium hydroxide while stirring to make the mixture just alkaline, and filtering, washing, drying, and breaking up the dried cake, all as described in Example 3.

An equimolar mixture of acetylene and hydrogen cyanide was passed over the catalyst while the temperature of the catalyst tube was gradually increased from 300° C. by an electrically heated coil surrounding it. Substantial reaction started at approximately 346° C. and the temperature then rose rapidly to 480° C. 16½% of the hydrogen cyanide was converted and a yield of 38.4% acrylonitrile was obtained.

*Example 8.*—Equal parts of Cd(NO₃)₂4H₂O and Superfloss were added to water and then while stirring, sufficient ammonia was also added to make the mixture slightly alkaline. The product was filtered, washed, dried, and broken up as in Example 3.

When an equimolar mixture of acetylene and hydrogen cyanide was passed over this catalyst while the temperature was gradually raised a 41% conversion of hydrogen cyanide and a 33.6% yield of acrylonitrile was obtained. A maximum temperature of 454° C. was obtained and some reaction occurred at as low a temperature as 360° C.

*Example 9.*—A zinc ferrocyanide catalyst was prepared in the following manner: Two parts of Superfloss and one part K₄Fe(CN)₆3H₂O were added to water. To the slurry was added, while stirring, a solution containing an equivalent amount of zinc nitrate. The product was filtered, washed, dried and broken up as in Example 3.

Over a temperature range of from 390° to 490° C. this catalyst produced a 72% conversion of hydrogen cyanide and a 51% yield of acrylonitrile from an equimolar mixture of the reactants.

*Example 10.*—Ten parts of zinc dust and 90 parts of Superfloss were mixed thoroughly with water, filtered, pressed, and dried. The dried filter cake was broken up to 4–10 mesh particles which were screened and used as the catalyst.

200 cc. of this catalyst was placed in the tube and a mixture of nitrogen and HCN was passed through the tube for one-half hour at 350–450° C. before the run.

Then a mixture of equimolar quantities of HCN and acetylene was passed through the tube at a rate of 22 liters per hour. The reaction started at 420° C. and the temperature gradually increased to 475° C. 64% of the HCN passed through the tube was consumed. The yield of acrylonitrile based on hydrogen cyanide consumed was 44% of theory.

In the foregoing examples there has been used for purposes of illustration, catalyst made from a single active metal and for the most part a commercially available diatomaceous earth has been used as the inert carrier. Mixtures of zinc catalysts with either cadmium or magnesium catalysts or mixtures of the latter two may also be used with equally good results. Magnesium oxide may, for example, be mixed with the carrier and a zinc salt deposited on the mixture whereby there is obtained in the catalyst a degree of alkalinity which is desirable. Complex salts such as a basic zinc magnesium phosphate may likewise be used. In place of the Superfloss and quartz particles used in the examples, various other inert carriers may be used, as for instance, pumice may be impregnated with a solution of zinc, cadmium or magnesium compound and either evaporated to dryness or treated to precipitate an insoluble compound.

Various other methods for recovering and separating the reaction products and the unreacted acetylene and hydrogen cyanide may also be practiced. The heat in the reaction products leaving the catalyst tube may, for instance, be used to heat the incoming gases, thereafter the reaction gases are cooled to approximately 20 to 30° C. to condense the high boiling liquids and the remaining acrylonitrile separated by scrubbing with a solvent or by means of an absorbent such as activated charcoal. The acrylonitrile and the absorbed hydrogen cyanide may then be recovered by distilling them from the solvent or by passing steam through the solid absorbent, condensing and distilling from the condensate first the hydrogen cyanide, which may be recirculated, and then a constant boiling mixture of acrylonitrile and water (boiling point 69°–70° C.). This mixture separates into layers on being condensed.

The residue of higher boiling reaction products from which the acrylonitrile was distilled in the practice of the invention as described in the examples or which is initially condensed in the alternative procedure described in the preceding paragraph contains small but appreciable amounts of acrylonitrile. This may be recovered by adding water to the residue and distilling out the constant boiling acrylonitrile-water mixture.

We claim:

1. The process of making acrylonitrile which comprises reacting acetylene and hydrogen cyanide in vapor phase in the presence of a catalytic agent containing a metal from the group consisting of cadmium, magnesium, and zinc.

2. The process of making acrylonitrile which comprises reacting acetylene and hydrogen cyanide in vapor phase in the presence of a small amount of water vapor and a catalytic agent containing a metal from the group consisting of cadmium, magnesium, and zinc.

3. The process of making acrylonitrile which comprises reacting acetylene and hydrogen cyanide in vapor phase in the presence of a catalytic agent of alkaline reaction containing a metal from the group consisting of cadmium, magnesium, and zinc.

4. The process of making acrylonitrile which comprises reacting acetylene and hydrogen cyanide at a temperature of from 350° to 600° C. in the presence of a catalytic agent containing a metal from the group consisting of cadmium, magnesium, and zinc.

5. The process of making acrylonitrile which comprises reacting acetylene and hydrogen cyanide at a temperature of from 350° to 600° C. in the presence of a small amount of water vapor and a catalytic agent containing a metal from the group consisting of cadmium, magnesium, and zinc.

6. The process of making acrylonitrile which comprises reacting acetylene and hydrogen cyanide in the presence of a zinc containing catalyst.

7. The process of making acrylonitrile which comprises reacting acetylene and hydrogen cyanide in the presence of a zinc containing catalyst at a temperature of from 350° to 600° C.

8. The process of making acrylonitrile which comprises passing a mixture of gases containing acetylene, hydrogen cyanide, and a small amount of water vapor over a zinc containing catalyst at a temperature of from 350° to 600° C.

9. The process of making acrylonitrile which comprises reacting acetylene and hydrogen cyanide in the presence of a catalyst containing a zinc compound capable of reacting with hydrogen cyanide at temperatures above 150° C. to form at least in part zinc cyanide.

10. The process of making acrylonitrile which comprises reacting acetylene and hydrogen cyanide in the presence of a catalyst containing zinc cyanide.

11. The process of making acrylonitrile which comprises reacting acetylene and hydrogen cyanide at a temperature of from 400° to 500° C. in the presence of a catalyst prepared by passing hydrogen cyanide over a zinc oxide catalyst at a temperature above 150° C.

LE ROY U. SPENCE.
DARREL J. BUTTERBAUGH.
EDWIN H. KROEKER.